(12) United States Patent
Lanfant et al.

(10) Patent No.: US 12,115,734 B2
(45) Date of Patent: Oct. 15, 2024

(54) METHOD FOR MANUFACTURING AN ACOUSTIC PANEL BY WELDING

(71) Applicant: SAFRAN, Paris (FR)

(72) Inventors: Nicolas Pierre Lanfant, Moissy-Cramayel (FR); Hugues Laurent Alglave, Moissy-Cramayel (FR); Patrick Dunleavy, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/697,556

(22) PCT Filed: Sep. 21, 2022

(86) PCT No.: PCT/FR2022/051778
§ 371 (c)(1),
(2) Date: Apr. 1, 2024

(87) PCT Pub. No.: WO2023/052707
PCT Pub. Date: Apr. 6, 2023

(65) Prior Publication Data
US 2024/0262042 A1   Aug. 8, 2024

(30) Foreign Application Priority Data

Oct. 1, 2021   (FR) ...................... 2110405

(51) Int. Cl.
*B29C 65/18*   (2006.01)
*B29C 65/00*   (2006.01)
(Continued)

(52) U.S. Cl.
CPC ........ *B29C 65/103* (2013.01); *B29C 66/1142* (2013.01); *B29C 66/12221* (2013.01);
(Continued)

(58) Field of Classification Search
CPC .............. B29C 65/103; B29C 66/1142; B29C 66/12221; B29C 66/244; B29C 66/81433; B29K 2079/085; B29L 2031/38
See application file for complete search history.

(56) References Cited

U.S. PATENT DOCUMENTS

| 5,912,442 A | 6/1999 | Nye et al. |
| 2004/0081797 A1 | 4/2004 | Simmons et al. |

(Continued)

FOREIGN PATENT DOCUMENTS

GB   2 314 526 A   1/1998

OTHER PUBLICATIONS

International Search Report as issued in International Patent Application No. PCT/FR2022/051778, dated Dec. 12, 2022.
(Continued)

*Primary Examiner* — Daniel H Lee
(74) *Attorney, Agent, or Firm* — Pillsbury Winthrop Shaw Pittman LLP (57) ABSTRACT

A method for manufacturing an acoustic panel by welding of at least two acoustic components made of thermoplastic material, a thermal gradient being applied on the acoustic components during the welding operation so as to apply a temperature higher than the glass transition or melting temperature of the material on the area to be welded and so as to apply a temperature lower than or equal to the geometric stabilization temperature of the material on the parts furthest from the area to be welded.

10 Claims, 8 Drawing Sheets

(51) Int. Cl.
    *B29C 65/10*    (2006.01)
    *B29K 79/00*    (2006.01)
    *B29L 31/38*    (2006.01)

(52) U.S. Cl.
    CPC ...... *B29C 66/244* (2013.01); *B29C 66/81433* (2013.01); *B29K 2079/085* (2013.01); *B29L 2031/38* (2013.01)

(56) References Cited

U.S. PATENT DOCUMENTS

2006/0102275 A1* 5/2006 Poulsen .............. B29C 66/1122
                                                    156/308.2
2011/0100747 A1   5/2011 Hoetzeldt et al.
2012/0267828 A1  10/2012 Halford

OTHER PUBLICATIONS

Written Opinion of the International Searching Authority as issued in International Patent Application No. PCT/FR2022/051778, dated Dec. 12, 2022.

* cited by examiner

METHOD FOR MANUFACTURING AN ACOUSTIC PANEL BY WELDING

CROSS-REFERENCE TO RELATED APPLICATIONS

This application is the U.S. National Stage of PCT/FR2022/051778, filed Sep. 21, 2022, which in turn claims priority to French patent application number 2110405 filed Oct. 1, 2021. The content of these applications are incorporated herein by reference in their entirety.

TECHNICAL FIELD

The present invention relates to the general field of acoustic attenuation structures. It more particularly concerns the acoustic attenuation structures used to reduce the noise produced in aircraft engines as well as in gas turbines or exhaust thereof.

PRIOR ART

The acoustic attenuation structures are typically made up of an acoustic surface plate or skin permeable to the acoustic waves to be attenuated and of a full reflective plate or skin called "closing plate", a cellular body being disposed between these two walls. The cellular body is generally made of a set of partitions, for example of honeycomb shape, and made of an acoustic panel comprising complex hollow acoustic elements, for example cones. In a well-known manner, such structures form Helmholtz type resonators which make it possible to attenuate the acoustic waves in a certain frequency range. Acoustic attenuation structures of this type are in particular described in documents U.S. Pat. No. 5,912,442 and GB 2 314 526. To make acoustic attenuation structures with large dimensions, it is necessary to manufacture a large-sized acoustic panel.

The acoustic panels are conventionally made by injection and/or stamping. However, the size of the achievable structures is limited by the manufacturing means, for example by the dimensions of the injection tooling.

Thus, to make large-sized acoustic attenuation structures, it may be necessary to assemble several smaller acoustic sub-panels, also called acoustic components.

The assembly of the acoustic components can be carried out using fixing systems, comprising for example bores. However, such fixing systems reduce the acoustic performance and increase bulk. Indeed, the functional surface of the acoustic components intended for the acoustic attenuation is reduced to allow the placement of these fixing systems.

The acoustic components can also be assembled by welding, by significantly heating the junction between the acoustic components. However, carrying out the welding also causes, by thermal diffusion, the heating of parts of the acoustic components further away from the junction, which leads to deformation of the components and therefore to an uncontrolled modification of their geometry.

It is therefore necessary to use large-dimensioned holding toolings to maintain the geometry of the acoustic components despite high temperatures. Thus, the size of the achievable acoustic structures is limited by the dimensions of the holding tooling.

DISCLOSURE OF THE INVENTION

The main aim of the present invention is therefore to make large-dimensioned acoustic structures while overcoming the aforementioned drawbacks.

In accordance with the invention, this aim is achieved thanks to a method for manufacturing an acoustic panel comprising the manufacture of at least a first acoustic component and a second acoustic component made of thermoplastic material each comprising a plurality of hollow acoustic elements, the first component comprising a first joining edge and the second component comprising a second joining edge, the first component and the second component being welded to each other by the first and second joining edges to form at least part of the acoustic panel, the method being characterized in that, during the welding operation, a tooling covers part of the first and second components comprising the first and second joining edges so as to match the geometry of the covered hollow acoustic elements, and in that a thermal gradient is applied on the parts of the first component and of the second component covered by the tooling so as to apply a temperature higher than the glass transition or melting temperature of the thermoplastic material on the first and second joining edges and so as to apply a temperature lower than or equal to the geometric stabilization temperature of the thermoplastic material on the hollow acoustic elements covered by the tooling that are furthest from the first and second joining edges.

Thus, to make a large-sized acoustic panel, it is particularly interesting to assemble the acoustic components by welding them to each other, to maintain a large functional surface from an acoustic point of view without increasing the bulk. The mounting cost is also reduced, since it is possible to handle one large acoustic component rather than several small acoustic components. Finally, the overall mass of the acoustic panel is reduced by strongly limiting the number and size of the necessary fixing elements, or even completely eliminating the fixing elements.

The welding of the joining edges of the components requires a high temperature, which is likely to deform or modify the geometry of the acoustic components by thermal diffusion, including in the parts remote from the welding. So that it is not necessary to use large-dimensioned heating or holding toolings to maintain the geometry of the acoustic components despite the high temperatures, the invention proposes the use of a thermal gradient.

Thus, only the portion of the acoustic components located close to the weld is subjected to a high temperature, while the temperature of the acoustic components at the tooling outlet is low enough to avoid any deformation or modification of their geometry. The dimensions of the used welding tooling are therefore significantly smaller than those of the acoustic panel to be made, which therefore makes it possible to manufacture a large-sized acoustic panel. The welding tooling used is also easier to handle and can be reused very quickly. Thus, it makes it possible to successively make several welds between different acoustic components.

According to one particular characteristic of the invention, part of the hollow acoustic elements of the first component and of the second component is located outside the tooling.

According to another particular characteristic of the invention, the second joining edge partly covers the first joining edge.

According to another particular characteristic of the invention, an extra thickness of material is present along the first and the second joining edge.

According to another particular characteristic of the invention, the thermal gradient is made by pulsed air, by performing a control per tooling temperature area.

According to another particular characteristic of the invention, the thermoplastic material is a polyetherimide.

According to another particular characteristic of the invention, the temperature applied on the first and second joining edges is greater than 420° C. and the temperature applied on the hollow acoustic elements covered by the tooling that are furthest from the first and second joining edges is less than 215° C. Preferably, the temperature applied on the hollow acoustic elements covered by the tooling that are furthest from the first and second joining edges is less than 200° C.

The temperatures described here are particularly relevant in the case of acoustic components made of polyetherimide (PEI).

The invention further relates to a method for manufacturing an acoustic attenuation structure comprising the following steps:
 manufacturing an acoustic panel according to the method of the invention,
 making a cellular body comprising the acoustic panel and a plurality of partitions forming acoustic cavities, each hollow acoustic element of the acoustic panel being housed in an acoustic cavity so as to form an acoustic cell,
 assembling a first face of the cellular body with an assembly face of an acoustic skin.

According to one particular characteristic of the invention, the method further comprises the assembly of a second face of the cellular body opposite to the first face covered by the acoustic skin with an assembly face of a closing skin.

The invention further relates to an aeronautical engine casing, or aeronautical propulsion assembly casing, comprising at least one acoustic attenuation structure manufactured according to the method of the invention.

DESCRIPTION OF THE EMBODIMENTS

FIGS. 1 to 6 illustrate a manufacturing method according to the invention of an acoustic panel including complex hollow acoustic elements. This acoustic panel is intended to be assembled with an acoustic skin, a plurality of partitions and possibly a closing skin to form a complete acoustic attenuation structure.

Figure 1:
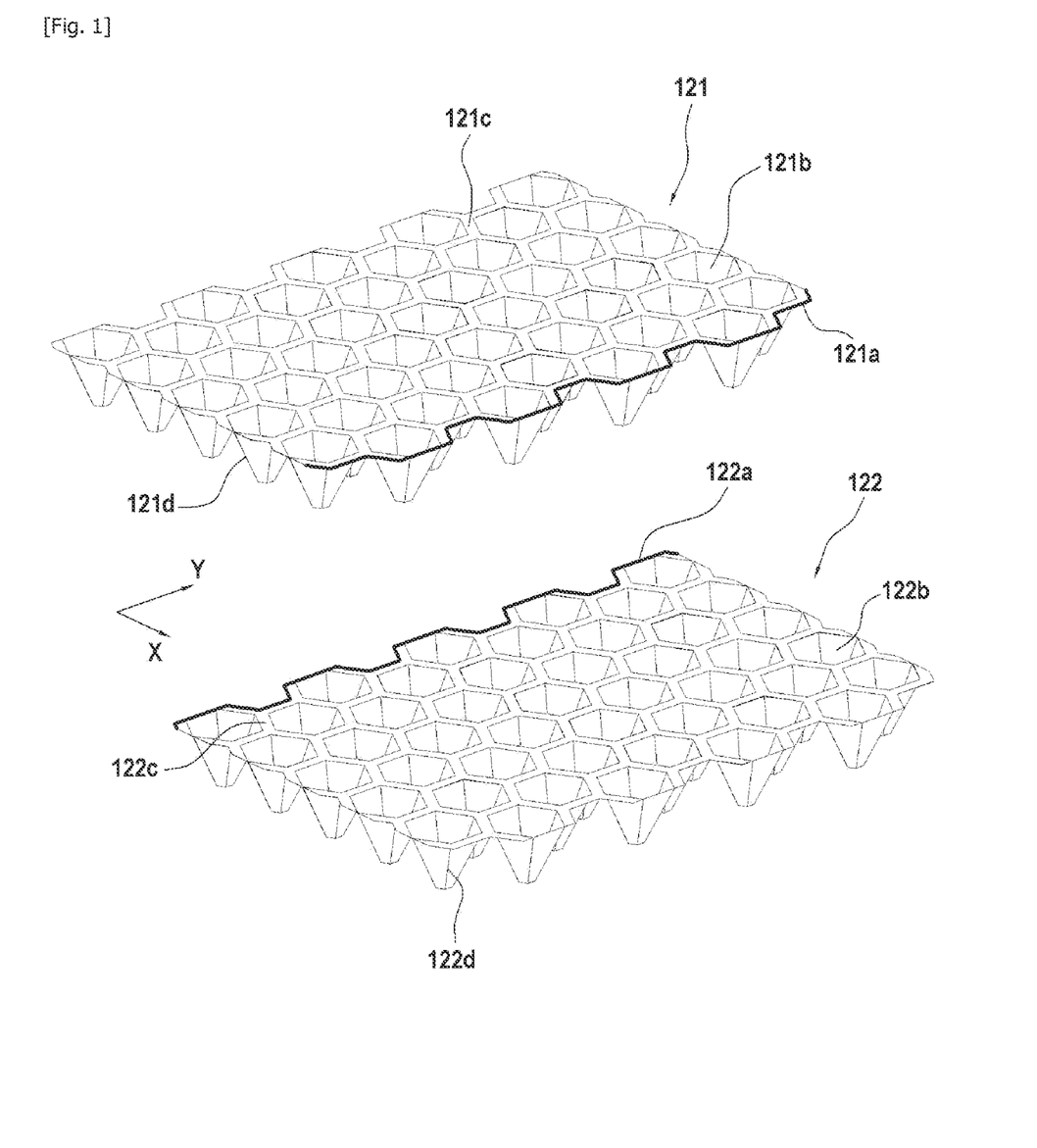
FIG. 1 is a perspective representation of two acoustic components to be welded to obtain an acoustic panel.

FIG. 1 illustrates a first acoustic component 121 and a second acoustic component 122.

The acoustic components 121 and 122 extend in width along a direction X and in length along a direction Y.

The first acoustic component 121 comprises an upper face 121c and a lower face 121d opposite to the first face 121c. The faces 121c and 121d extend along the directions X and Y. The upper face 121c of the first acoustic component 121 comprises a plurality of hollow complex acoustic elements 121b.

The second acoustic component 122 comprises an upper face 122c and a lower face 122d opposite to the upper face 122c. The faces 122c and 122d extend along the directions X and Y. The upper face 122c of the second acoustic component 122 comprises a plurality of hollow complex acoustic elements 122b.

In the example illustrated in FIGS. 1 to 8, the acoustic components 121 and 122 are straight. Of course, there is no departure from the framework of the invention if the acoustic components are curved or have angles. In this case, the welding tooling described below must be adapted to the curvatures or angles of said acoustic components.

The first acoustic component 121 and the second acoustic component 122 are intended to be welded to each other to form an acoustic panel. Thus, the upper face 121c of the first acoustic component 121 comprises a first joining edge 121a and the upper face 122c of the second acoustic component 122 comprises a second joining edge 122a. The first joining edge 121a of the first acoustic component 121 is therefore intended to be welded to the second joining edge 122a of the second acoustic component 122.

The acoustic components 121 and 122 are formed in a single piece. They can be made in a well-known manner of thermoplastic material by injection or stamping. The thermoplastic material can be loaded with short fibers or with continuous fibers. Thermoplastic material may not be loaded.

The acoustic components 121 and 122 can also be made in a well-known manner by injection-compression of a loaded or unloaded thermoplastic material. The injection-compression consists in injecting the material into a half-open mold. Thus, even if the material freezes, the channels become less obstructed. When the material is distributed throughout the mold, it is completely closed by a closing force to return to the correct dimension. This makes it possible to obtain thinner wall thicknesses for the acoustic components than with a traditional injection method.

The acoustic components 121 and 122 can also be made in a well-known manner by injection with control of the temperature of the tooling of a loaded or unloaded thermoplastic material. The injection with tooling temperature control consists in monitoring the temperature of the tooling or of the mold by means of a system for servo-controlling the temperature of the tooling, for example with a heat transfer fluid or with the air.

The thermoplastic materials which can be used to manufacture the acoustic components 121 and 122 are in particular polyaryletherketones (PAEK) such as polyetheretherketone (PEEK) and polyetherketoneketone (PEKK), polyetherimides (PEI), polyphenylene sulfide (PPS), polyethersulfone (PESU) and polysulfone (PSU).

In the example presented in FIGS. 1 to 8, the hollow complex acoustic elements have a pyramidal shape. However, there is no departed from the framework of the invention if the hollow complex acoustic elements have for example a conical, spiral or funnel shape. Preferably, the hollow complex acoustic elements have a shape that gradually tapers from the upper face of the component towards the lower face of the acoustic component.

Figure 2:
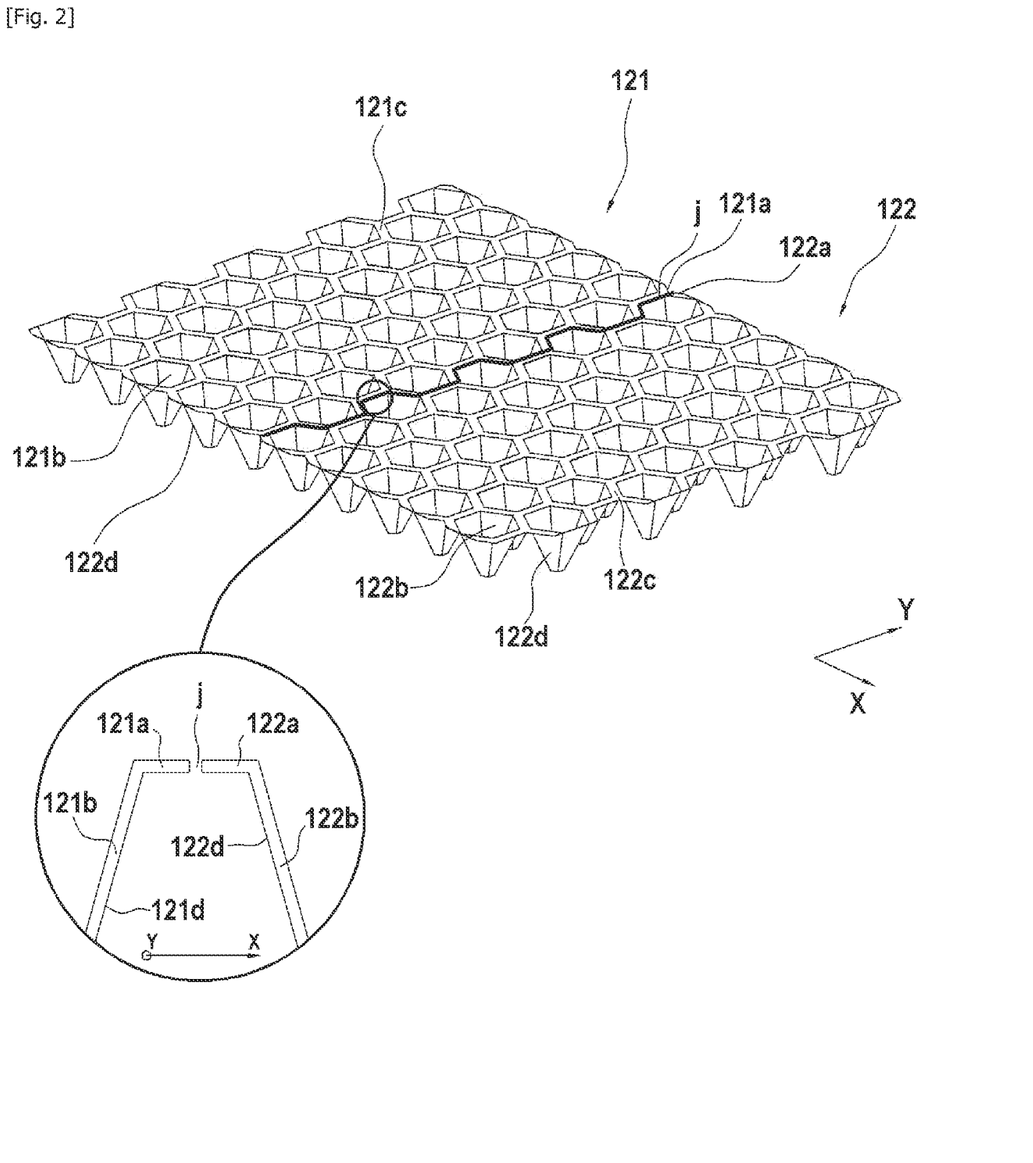
FIG. 2 is a perspective representation of the positioning of the two acoustic components of FIG. 1.

The acoustic components 121 and 122 are then put in position so as to allow the welding, as illustrated in FIG. 2. Thus, the first joining edge 121a of the first acoustic component 121 is placed in the vicinity of, or in contact with, the second joining edge 122a of the second acoustic component 122, to define a junction j between the acoustic components 121 and 122. The positioning of the acoustic components 121 and 122 relative to each other makes it possible to obtain the shape of the acoustic panel to be made before welding.

Figure 3:
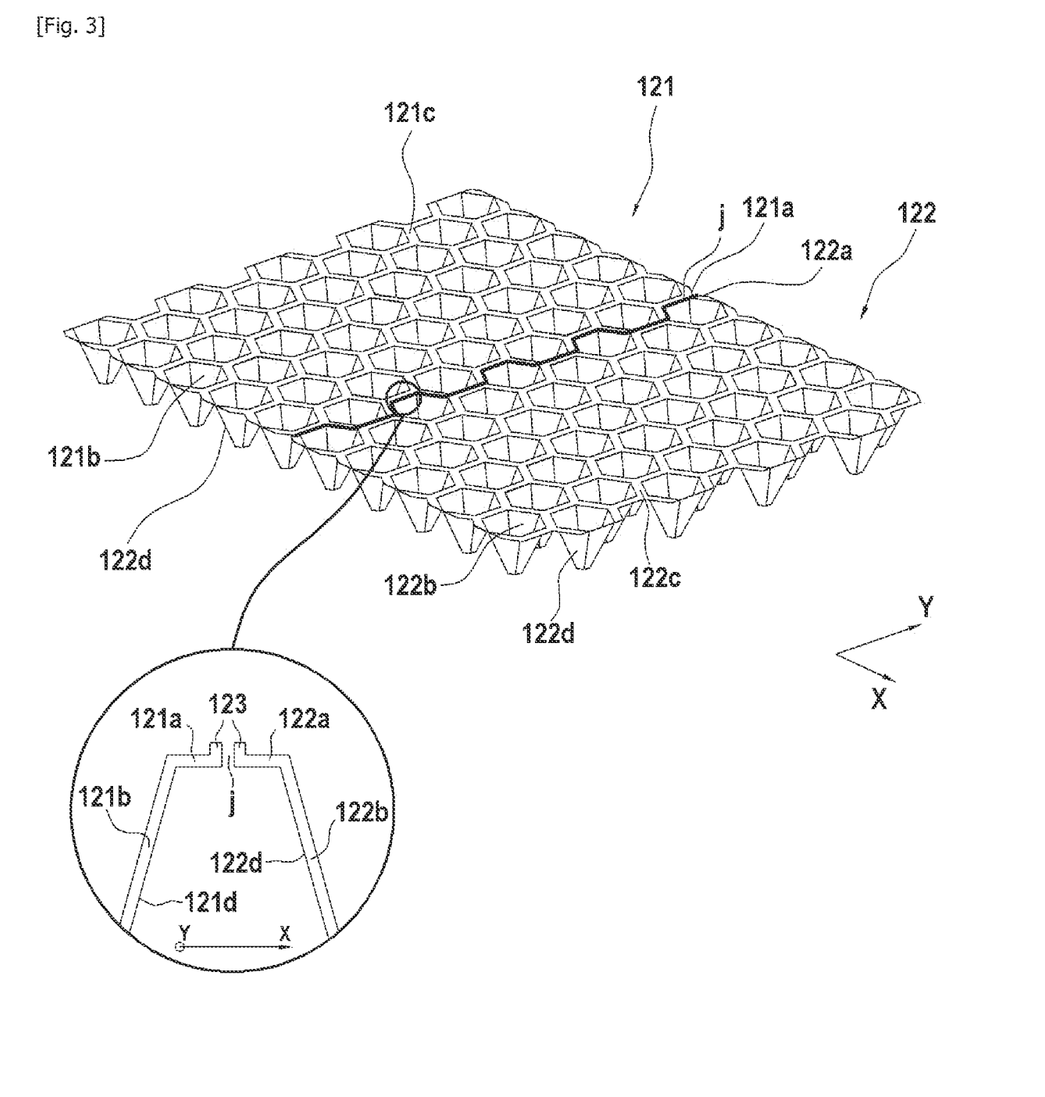
FIG. 3 is a perspective representation of the positioning of the two acoustic components of FIG. 1, the joining edges comprising extra thicknesses of material.

According to one variant illustrated in FIG. 3, extra thicknesses 123 may be present on the upper face 121c of the first acoustic component 121, along the first joining edge 121a. Likewise, extra thicknesses 123 may be present on the upper face 122c of the second acoustic component 122, along the second joining edge 122a. Said extra thicknesses of material 123 rise perpendicularly to the directions X and Y, along the junction j. These extra thicknesses of material 123 are traditionally made of thermoplastic material, preferably identical to the one used to make the acoustic component 121 or 122. Preferably, these extra thicknesses 123 are made simultaneously with the rest of the acoustic component, to form the whole in a single piece. These extra thicknesses 123 facilitate the welding at the junction j of the acoustic components 121 and 122, by providing an excess of thermoplastic material making it possible to more easily fill the gap between the two components during welding. A vertical pressure can also be applied on the entire tooling or only on the junction j so as to force the extra thicknesses 123 into the gap present between the two components.

Figure 4:
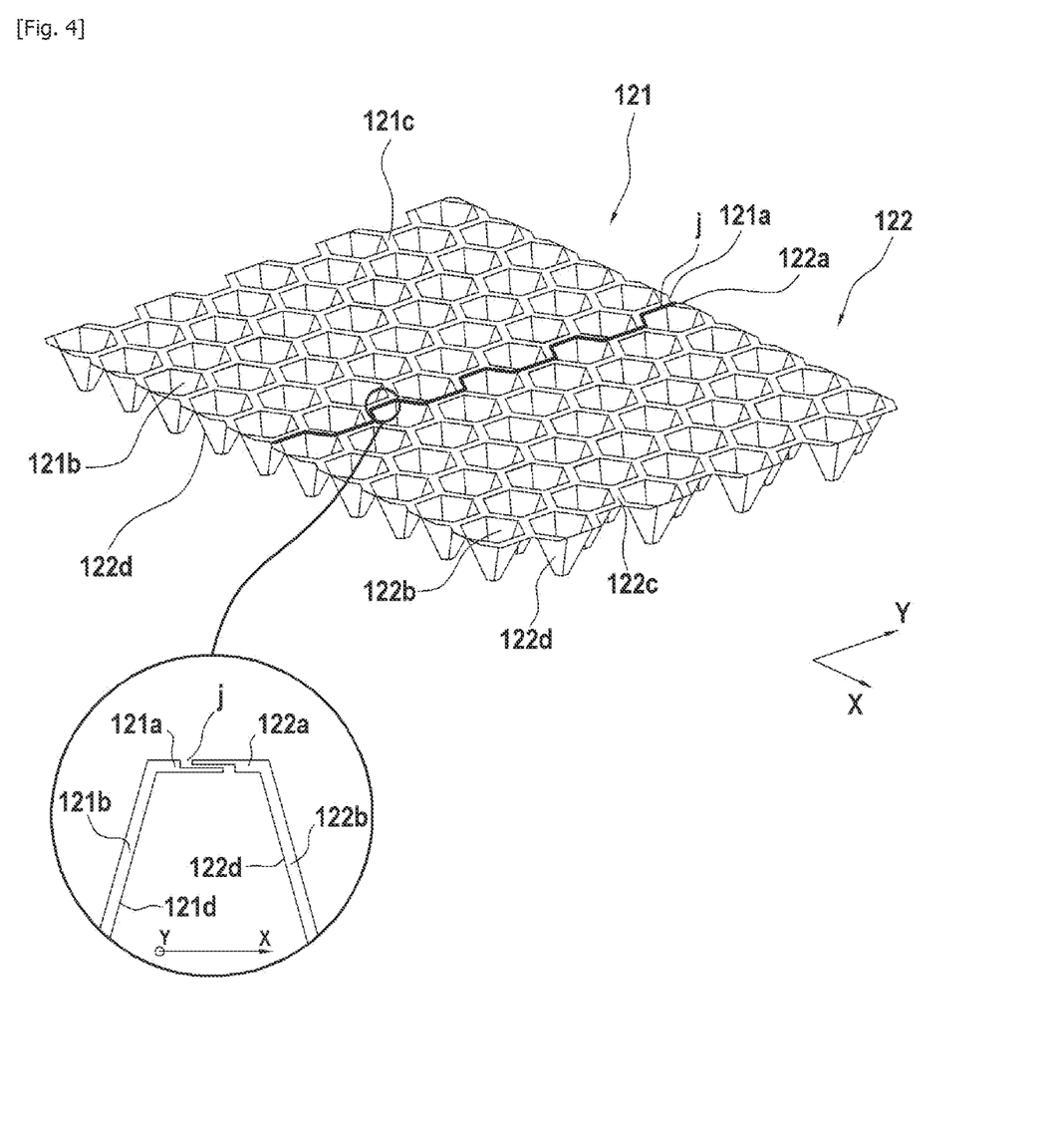
FIG. 4 is a perspective representation of the positioning of the two acoustic components of FIG. 1, the joining edges overlapping at the junction of two components.

According to one variant illustrated in FIG. 4, an overlap of the first acoustic component 121 with the second acoustic component 122 can be made at the junction j between the two components 121 and 122. This overlap can in particular be made by reducing on one part the thickness of the first joining edge 121a and/or by reducing on one part the thickness of the second joining edge 122a.

Figure 5:
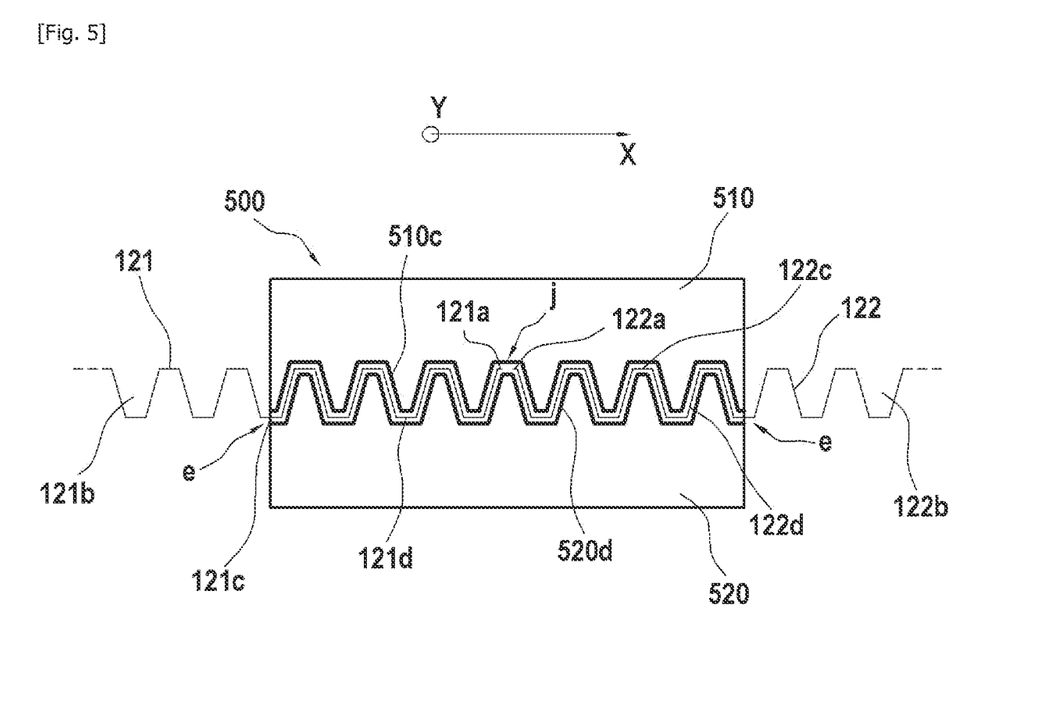
FIG. 5 is a sectional representation of a welding tooling in which the acoustic components to be welded are positioned.

FIG. 5 illustrates a welding tooling 500 comprising a mold 510 and a counter-mold 520. The mold 510 comprises teeth 510c and the counter-mold 520 comprises molding cavities 520d intended to cooperate with the teeth 510c to match the shape of the acoustic components 121 and 122 in the vicinity of their junction j.

The mold and/or the counter-mold of the welding tooling can be presented in several distinct parts, in order to facilitate the application of different pressures or temperatures in particular areas of the acoustic components, for example by distinguishing the junction area, in other words the welding area, from the other areas.

As illustrated in FIG. 5, the acoustic components 121 and 122 are positioned in the welding tooling 500 so that the first joining edge 121a and the second joining edge 122a are entirely present inside the tooling 500, while the parts of the acoustic components 121 and 122 furthest from the joining edges 121a and 121b are preferably located outside the tooling 500.

Particularly, the upper face 121c of the first acoustic component 121 and the upper face 122c of the second acoustic component 122 are placed in contact with the mold 510, so that the teeth 510c of the mold 510 match the shape of the hollow complex acoustic elements 121b and 122b of the acoustic components 121 and 122. Furthermore, the lower face 121d of the first acoustic component 121 and the lower face 122d of the second acoustic component 122 are placed in contact with the counter-mold 520, so that the molding cavities 520d of the counter-mold mold 520 match the shape of the hollow complex acoustic elements 121b and 122b of the acoustic components 121 and 122.

The welding tooling 500 has a temperature regulation system making it possible to apply a temperature gradient on the acoustic components 121 and 121 partly disposed in the welding tooling 500.

Figure 6:
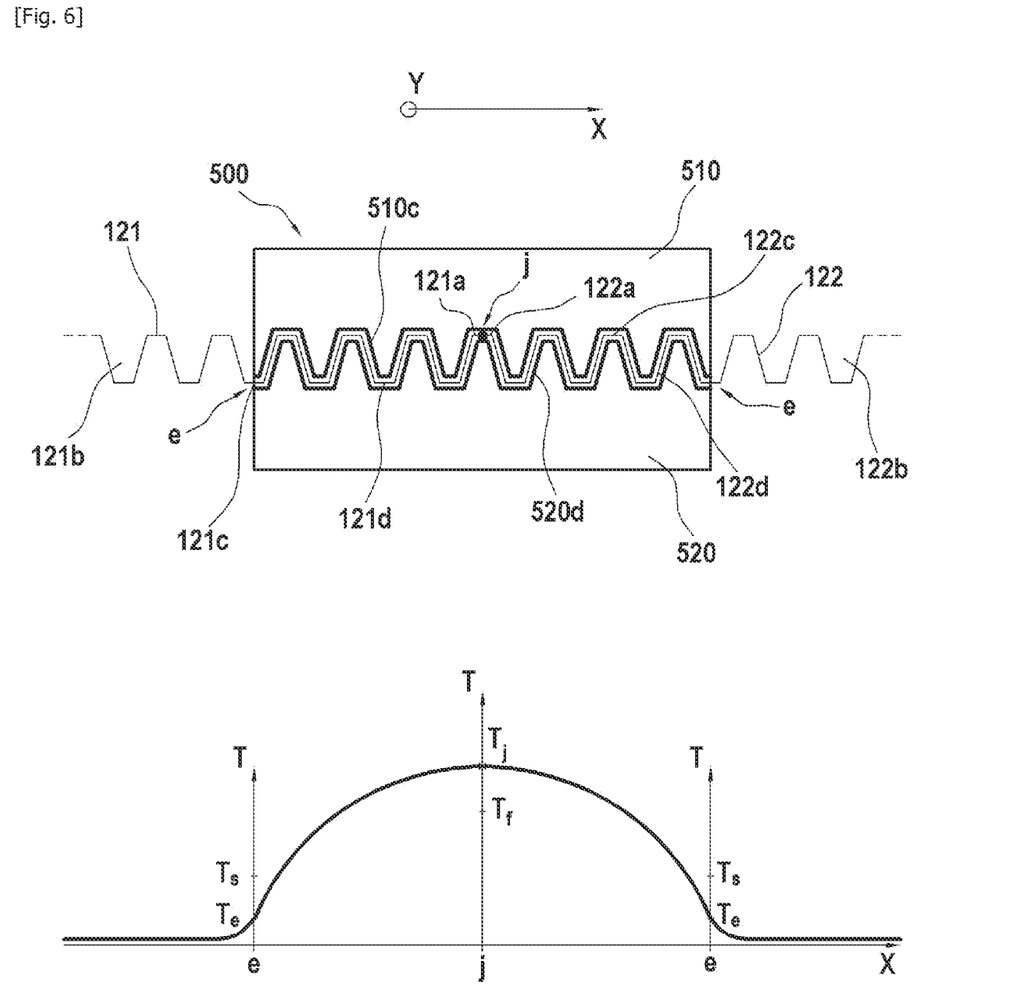
FIG. 6 is a representation of the temperature of the acoustic components inside the soldering tooling of FIG. 5 as a function of their distance from the junction.

When the acoustic components 121 and 122 are placed in the welding tooling 500, a thermal gradient is applied in the mold 510 and/or in the counter-mold 520. As illustrated in FIG. 6, the thermal gradient thus implemented makes it possible to apply a temperature $T_j$ at the junction of the acoustic components 121 and 122 which is higher than the melting temperature $T_f$ of the thermoplastic material. Indeed, in the case of a non-amorphous thermoplastic, it will be preferred to apply a temperature $T_j$ at the junction of the acoustic components 121 and 122 higher than the melting temperature $T_f$ of the material. However, there is no departure from the framework of the invention if the temperature applied at the junction of the acoustic components is just higher than the glass transition temperature of the material. In the case of an amorphous thermoplastic, a temperature that is higher than the glass transition temperature of the material can be applied at the junction of the acoustic components.

The application of a temperature $T_j$ higher than the melting temperature $T_f$ at the junction of the acoustic components 121 and 122 makes it possible to weld the first joining edge 121a to the second joining edge 122a. The thermal gradient also makes it possible to apply a gradually decreasing temperature to the parts e of the acoustic components 121 and 122 furthest from the junction j. At the ends of the welding tooling 500, the thermal gradient applies a temperature $T_e$ lower than the geometric stabilization temperature of the thermoplastic material $T_s$ in the parts e of the acoustic components 121 and 122. Thus, the temperature that will be diffused into the parts of the acoustic components 121 and 122 located outside the mold will be lower than the temperature $T_e$ present at the ends of the tooling 500, and thus lower than the geometric stabilization temperature $T_s$.

The profile of the thermal gradient presented in FIG. 6 is given as an example only and is not limiting. Indeed, other profiles are also possible, such as a Gaussian curve for example.

For example, in the case of acoustic components made of polyetherimide (PEI), the temperature $T_j$ applied at the junction j of the two acoustic components will be preferably greater than 420° C. The temperature $T_e$ applied on the parts e covered by the mold that are furthest from the junction j will be preferably lower than 215° C., and ideally lower than 180° C., in order to maintain a stabilized material.

Thus, there will be no deformation of the parts of the acoustic components 121 and 122 located outside the welding tooling 500. For the parts of the acoustic components 121 and 122 located inside the welding tooling 500 and subjected to temperatures higher than the geometric stabilization temperature $T_s$, the teeth 510 of the mold 510 and the molding cavities 520c of the counter-mold 520 make it possible to maintain the geometry of the acoustic components 121 and 122 during the welding and during the cooling.

The thermal gradient can be made in the welding tooling 500 by heat transfer fluid. Such technology is for example described in document US 2012267828 A1. The thermal gradient can also be made in a well-known manner by induction. Finally, according to one preferred embodiment of the invention, the thermal gradient can be made by pulsed air, using the "PtFS" (Production to Functional Specification) technologies from the Surface Generation Company. This technology makes it possible to apply very significant and localized temperature increase or decrease ramps, typically from 30° C. to 50° C. per minute. Furthermore, the surface temperature can be monitored to the nearest degree Celsius.

A supporting system or tooling can be used to support the parts of the acoustic components located outside the mold when being positioned in the welding tooling or during the welding operation (not represented).

A pressure can be applied on the junction between the two acoustic components during the welding. Indeed, porosities can be created in the thermoplastic material when it is brought to very high temperatures. Thus, the application of a pressure on the acoustic components during the welding helps reducing these porosities. Furthermore, the application of such pressure can promote the interpenetration of the thermoplastic chains at the junction between the two acoustic components. Finally, as described previously, the application of pressure in the case of extra thicknesses at the junction between the two acoustic components makes it possible to move the material of the extra thicknesses into the gap to be filled between the two acoustic components.

In the example illustrated in FIGS. 5 and 6, the welding tooling 500 covers three rows of hollow complex acoustic elements 121b of the first acoustic component 121 from the junction j and three rows of hollow complex acoustic elements 122b of the second acoustic component 122 from the junction j. Of course, there is no departure from the framework of the invention if the welding tooling covers more than three rows of acoustic elements of an acoustic component from the junction. Preferably, the welding tooling covers at least 6 rows of hollow acoustic elements of the first component from the junction and at least 6 rows of hollow acoustic elements of the second component from the junction. Preferably, the welding tooling covers at most 8 rows of hollow acoustic elements of the first component from the junction and at most 8 rows of hollow acoustic elements of the second component from the junction.

According to one preferred embodiment of the invention, to facilitate the application of the temperature gradient, the welding tooling covers the same number of rows of acoustic elements on each side of the junction j, that is to say the same number of rows of acoustic elements for each acoustic component. Indeed, this configuration makes it possible to apply a thermal gradient symmetrically on either side of the junction j. There is no departure from the framework of the invention if the tooling covers a different number of rows of acoustic elements for each acoustic component.

Following the welding operation described above, an acoustic panel 120 is obtained formed by the welding of two acoustic components 121 and 122, comprising a set of complex hollow acoustic elements 121b and 122b. By manufacturing an acoustic panel by welding of two or more acoustic components, it is possible to obtain a very large-sized acoustic panel. According to one particular embodiment of the invention, the acoustic panel thus obtained can comprise a side whose length is greater than or equal to 1,000 mm.

In the example described in FIGS. 1 to 6, the acoustic panel 120 is manufactured by welding two acoustic components 121 and 122. Of course, there is no departure from the framework of the invention if the acoustic panel is made by welding more than two acoustic components.

In the example presented in FIGS. 1 to 6, the first acoustic component is identical to the second acoustic component. There is no departure from the framework of the invention if one or more acoustic components have dimensions or geometry different from the other components.

In the example described in FIGS. 1 to 6, the acoustic panel 120 manufactured has a planar shape. There is no departure from the framework of the invention if the manufactured acoustic panel is curved, in which case the acoustic components, the welding tooling and any supporting toolings will be adapted.

Figure 7:
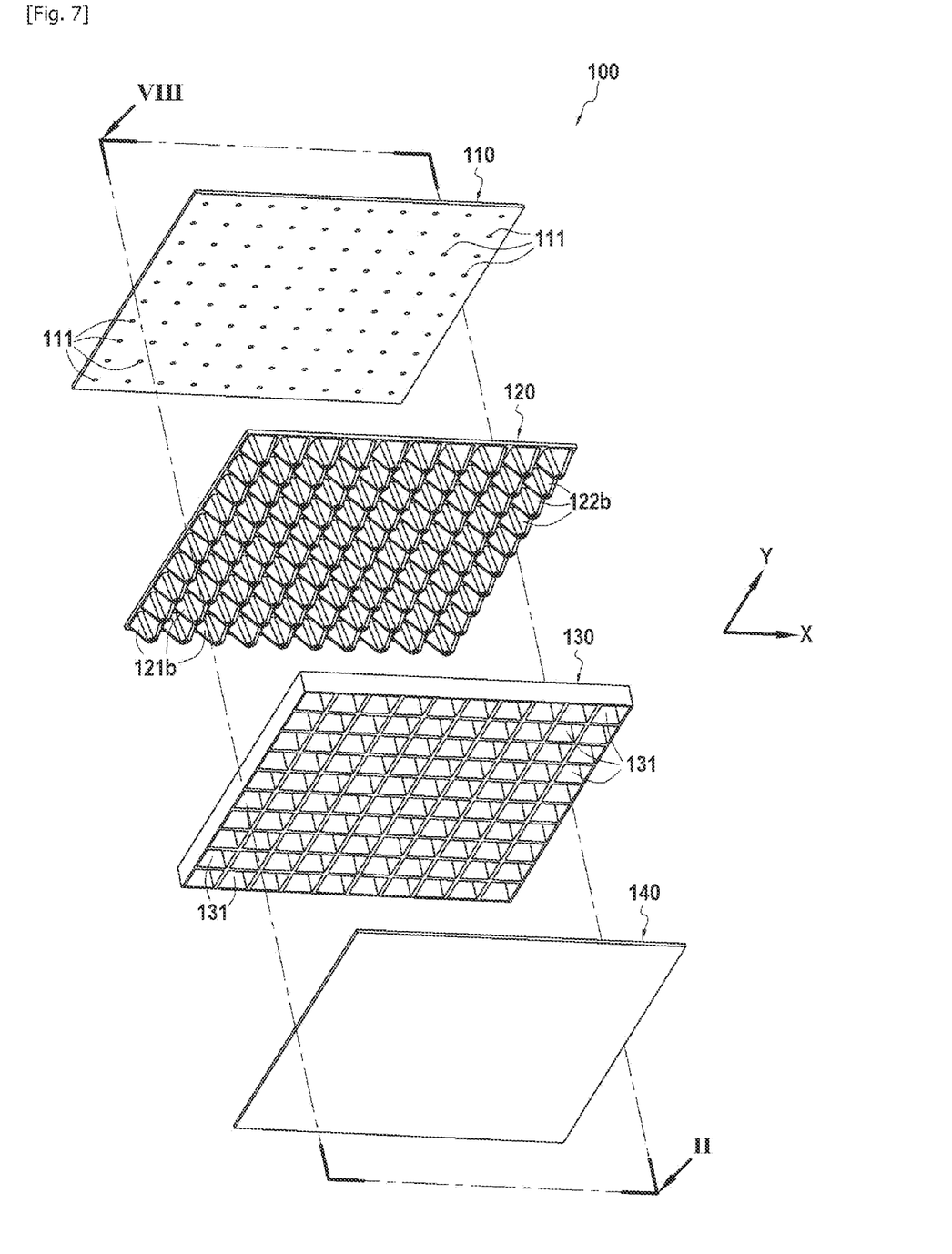
FIG. 7 is an exploded perspective representation of an acoustic structure comprising the acoustic panel manufactured according to the method of the invention.
Figure 8:
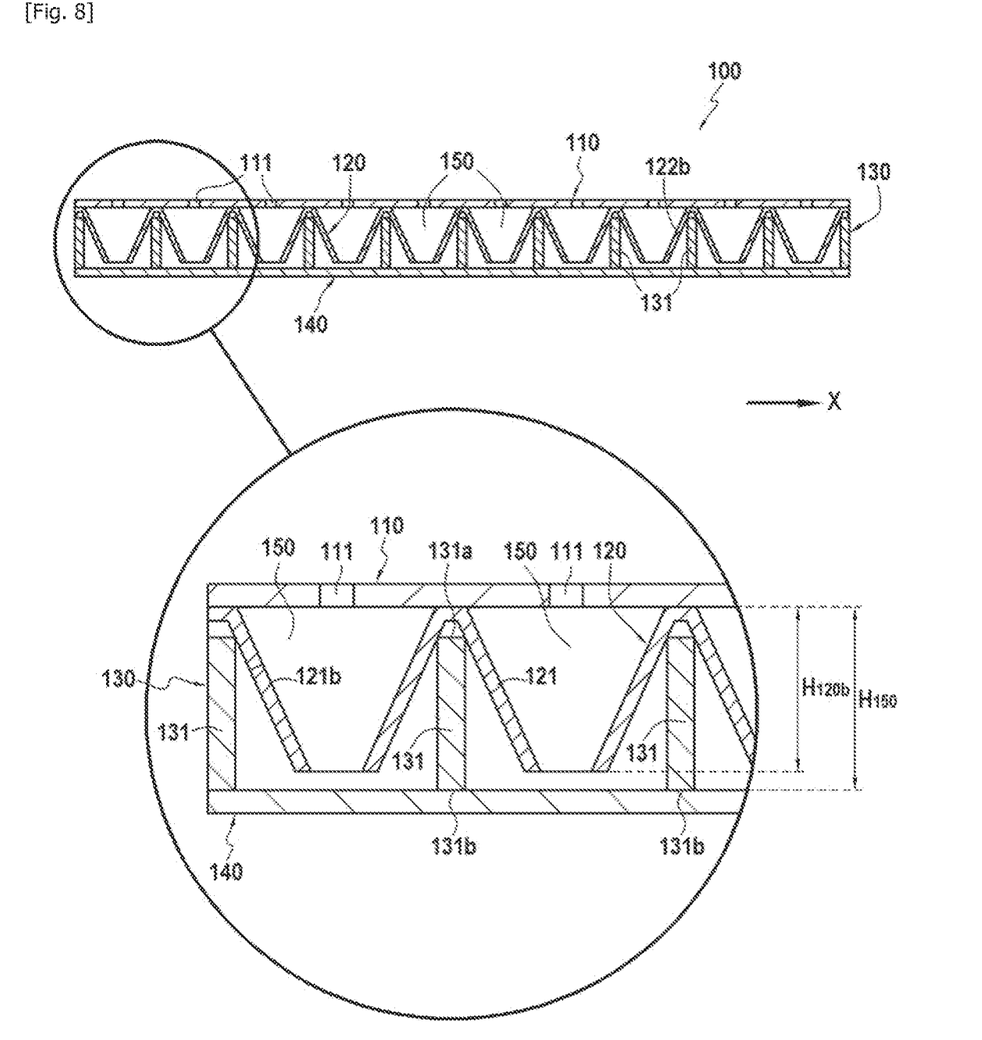
FIG. 8 is a sectional representation of the acoustic structure represented in FIG. 7.

FIGS. 7 and 8 will now describe a method for manufacturing an acoustic attenuation structure in accordance with one embodiment of the invention. The acoustic attenuation structure 100 here comprises an acoustic skin or plate 110, an acoustic panel 120 manufactured as described above, a plurality of partitions 131 and a closing skin or plate 140.

The closing skin 140 corresponds to a solid surface intended to reflect the sound waves entering the acoustic attenuation structure. The closing skin can be a constituent element of the acoustic attenuation structure as in the example described here or correspond to a structure of an object, for example an aircraft engine wall. In the latter case, the acoustic attenuation structure of the invention does not include a closing skin and is directly mounted on the structure of the object.

The acoustic skin 110 has the function of allowing the sound waves to be attenuated to pass inside the acoustic attenuation structure 100. For this purpose and in the example described here, the acoustic skin 110 comprises a plurality of perforations 111.

The acoustic panel 120 is formed by welding of at least two acoustic components 121 and 122 as described above and extends in length along a direction X and in width along a direction Y.

In the exemplary embodiment described here, the plurality of partitions 131 is made in a single piece, namely a network of ribs 130 which, once assembled with the acoustic panel 120, forms the partitions around the complex hollow acoustic elements 121b and 122b.

Still in the example described here, the acoustic attenuation structure 100 is made by assembling the acoustic panel 120 with the plurality of partitions 131, the upper edge 131a of the partitions 131 being fixed, for example by bonding or welding, based on the complex hollow acoustic elements 121b and 122b. The assembly between these two elements is greatly facilitated by the self-positioning of the hollow complex acoustic elements with the partitions.

The closing skin 140 is fixed, for example by bonding or welding, on the lower edge 131b of the partitions 131 while the acoustic skin 110 is fixed, by bonding or welding, on the upper portion of the bases of the complex hollow acoustic elements 121b and 122b corresponding to the exposed surface of the edges. Thus, the acoustic skin and the closing skin are each fixed on a perfectly planar support, which ensures a very good sealing between the skins and the assembly of the acoustic panel with the plurality of partitions.

Once assembled, the attenuation structure 100 comprises a plurality of acoustic cells 150 each formed by a complex hollow acoustic element 121b or 122b and the partitions 131 which surround it. The height H120b of the complex hollow acoustic elements 121b and 122b is smaller than the height H150 of the acoustic cells 150. The plurality of partitions can be made by injection of a loaded or unloaded thermoplastic or thermosetting material by injection-compression of a loaded or unloaded thermoplastic or thermosetting material or by injection with control of the temperature of the tooling of a loaded or unloaded thermoplastic or thermosetting material. The acoustic skin and the closing skin can be made by RTM injection, by draping or by stamping of a material with continuous fibers.

The acoustic attenuation structure thus manufactured can for example be used within an aeronautical engine casing, particularly within a casing of an aircraft propulsion assembly.

The invention claimed is:

1. A method for manufacturing an acoustic panel comprising manufacturing at least a first acoustic component and a second acoustic component made of thermoplastic material each comprising a plurality of hollow acoustic elements, the first component comprising a first joining edge and the second component comprising a second joining edge, the first component and the second component being welded to each other by the first and second joining edges to form at least part of the acoustic panel, wherein, during the welding operation, a tooling covers part of the first and second components comprising the first and second joining edges so as to match a geometry of the covered hollow acoustic elements, and wherein a thermal gradient is applied on the parts of the first component and of the second component covered by the tooling so as to apply a temperature higher than a glass transition or melting temperature of the thermoplastic material on the first and second joining edges and so as to apply a temperature lower than or equal to a geometric stabilization temperature of the thermoplastic material on the hollow acoustic elements covered by the tooling that are furthest from the first and second joining edges.

2. The manufacturing method according to claim 1, wherein part of the hollow acoustic elements of the first component and of the second component is located outside the tooling.

3. The manufacturing method according to claim 1, wherein the second joining edge partly covers the first joining edge.

4. The manufacturing method according to claim 1, wherein an extra thickness of material is present along the first and the second joining edge.

5. The manufacturing method according to claim 1, wherein the thermal gradient is made by pulsed air.

6. The manufacturing method according to claim 1, wherein the thermoplastic material is a polyetherimide.

7. The manufacturing method according to claim 6, wherein the temperature applied on the first and second joining edges is greater than 420° C. and wherein the temperature applied on the hollow acoustic elements covered by the tooling that are furthest from the first and second joining edges is less than 215° C.

8. A method for manufacturing an acoustic attenuation structure comprising:

manufacturing an acoustic panel according to the method as defined in claim 1, making a cellular body comprising the acoustic panel and a plurality of partitions forming acoustic cavities, each hollow acoustic element of the acoustic panel being housed in an acoustic cavity of so as to form an acoustic cell, assembling a first face of the cellular body with an assembly face of an acoustic skin.

9. The manufacturing method according to claim 8, further comprising assembling a second face of the cellular body opposite to the first face covered by the acoustic skin with an assembly face of a closing skin.

10. An aeronautical engine casing comprising at least one acoustic attenuation structure manufactured according to the method as defined in claim 8.

* * * * *